UNITED STATES PATENT OFFICE.

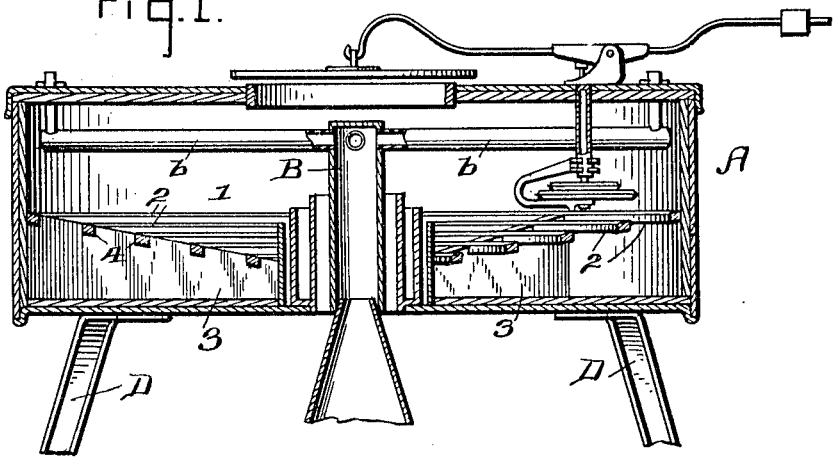
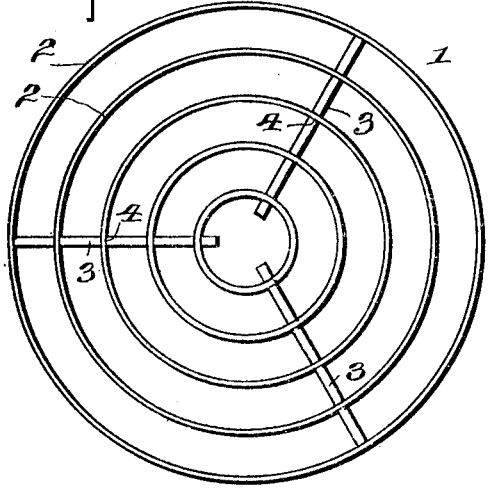
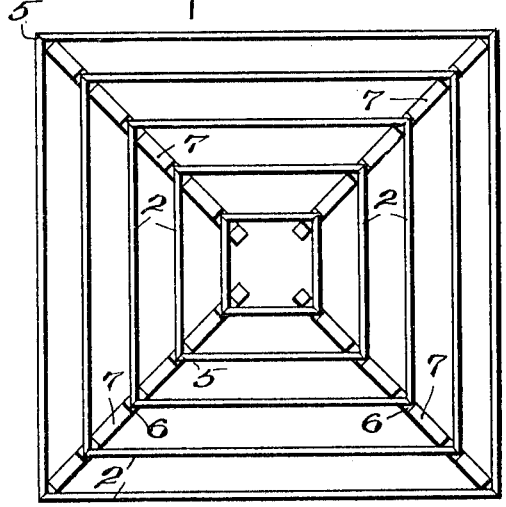

HENRY M. SHEER, OF QUINCY, ILLINOIS.

INCUBATOR.

1,273,679.

Specification of Letters Patent.

Patented July 23, 1918.

Application filed July 17, 1917. Serial No. 181,032.

*To all whom it may concern:*

Be it known that I, HENRY M. SHEER, a citizen of the United States, residing at Quincy, in the county of Adams and State of Illinois, have invented certain new and useful Improvements in Incubators, of which the following is a specification.

This invention relates to incubators of the center heated type, and one of the principal objects is to provide a uniform temperature throughout the entire egg surface in incubators of this type preferably by sloping the egg tray, thereby placing the outer edge of the tray closer to the heat radiating tubes.

A further object of my invention is to overcome the inclination of the eggs on the sloping tray to roll toward the center which at hatching time makes it difficult for the chicks near the center to get out of the eggs owing to the pressure of the mass of eggs farther up on the tray.

A still further object is to allow the newly hatched chicks, as well as the broken fragments of shell, to drop from the tray thereby eliminating the possibility of the chicks near the center being completely covered up by the newly hatched chicks at the outer edge of the tray scrambling about and carrying with them the broken fragments of shell.

In the accompanying drawings

Figure 1 is a transverse vertical section through the incubator.

Fig. 2 is a top plan view of the tray.

Fig. 3 is a plan view of a modified form of egg tray.

"A" indicates the incubator which is preferably provided with a centrally located heating chamber B having a plurality of radially disposed heating tubes *b* extending therefrom and which are heated in the usual manner by a lamp or other suitable heating medium, the whole being supported on suitable legs D.

1 indicates a tray which is adapted to surround the heating element and in this case preferably consists of a plurality of annularly arranged strips 2 which are suitably supported by a plurality of supports 3 arranged equidistant and radially within the incubator. The upper supporting edges of these supports are preferably provided with a plurality of notches 4 which are adapted to receive the annular strips 2, said supports 3 being higher at their outer edges thereby producing an inclined effect of the annular strips, this having the effect of bringing the outer annular strips nearer to the horizontally arranged heating tubes which has the effect of equalizing the temperature throughout the entire egg surface of the tray. It is a well known and established fact that in all incubators of this type the temperature next to the center where the heat distributer is located is certain to be higher than at the outer edge of the egg chamber, provided the eggs are on a level surface. Any change in the outside temperature often affects the walls of the incubator, producing corresponding change of temperature on the inside, therefore to equalize this temperature I have found it necessary to have a sloping egg tray which will bring the eggs to the outer edge of the egg chamber sufficiently close to the heating radiating system to equalize the temperature at the egg surface.

In Fig. 3 I have shown a modified form of tray which is adapted to be used in the center heated type of incubator having a square chamber. In this case the plurality of supporting strips 2, 2, are arranged rectangularly, their intersecting ends 5 being properly mitered and received within the notches 6 of the supporting members 7, in a manner as disclosed in Fig. 3. These supporting strips 7 are likewise higher at their outer edges thereby producing the sloping effect of the egg tray.

When eggs are placed in this position, however, on a smooth bottom tray such as is generally used in incubators, they have a natural tendency of course to roll toward the center. This produces considerable pressure against the eggs that are nearest the center, and at hatching time is the cause of disastrous results. The chicks which do hatch scramble about and produce additional pressure against the eggs near the center, and in addition to this the egg shells and other litter will quite naturally be shifted toward the center, covering the eggs to such an extent that it is impossible for the chicks to hatch.

In my construction the tray is given the proper elevation at the outer edge of the egg chamber to produce the uniformity I desire. The spacing of the annular supporting strips of the tray permits the chicks to drop through as soon as they are hatched, the greater part of the egg shell will also drop through. In this construction, no matter how much the eggs may be elevated around the outer edge of the tray, they can exert no pressure on the eggs lower down either during the period of incubation or at the time of exclusion. Each and every chick has identically the same opportunity to get out of the shell and cannot possibly be molested by any of the chicks which are already out. It will thus be seen I have constructed an arrangement, a simple and inexpensive egg tray which is of the highest efficiency.

I claim:

1. An egg-tray consisting of a plurality of annularly-arranged spaced strips having openings therebetween, radially-arranged supports provided with notches adapted to receive said strips, said supports made higher at their outer edges, whereby the strips are caused to slope toward the center of the tray.

2. An egg tray for incubators consisting of a plurality of spaced strips arranged around a given point, supports provided with notches adapted to receive said strips extending radially from the given point, said supports made higher at their outer edges thereby causing the strips to slope toward the center of the tray.

In testimony whereof I affix my signature.

HENRY M. SHEER.

Witnesses:
RAY R. MENKE,
HELEN KLUSMAN.

Copies of this patent may be obtained for five cents each, by addressing the "Commissioner of Patents, Washington, D. C."